(12) United States Patent
Kim et al.

(10) Patent No.: US 10,796,694 B2
(45) Date of Patent: Oct. 6, 2020

(54) OPTIMUM CONTROL METHOD BASED ON MULTI-MODE COMMAND OF OPERATION-VOICE, AND ELECTRONIC DEVICE TO WHICH SAME IS APPLIED

(71) Applicant: VTOUCH CO., LTD., Seoul (KR)

(72) Inventors: Seokjoong Kim, Seoul (KR); Chunghoon Kim, Seongnam-si (KR); So Yeon Kim, Seoul (KR)

(73) Assignee: VTOUCH CO., LTD., Seoul (KR)

( * ) Notice: Subject to any disclaimer, the term of this patent is extended or adjusted under 35 U.S.C. 154(b) by 123 days.

(21) Appl. No.: 16/134,511

(22) Filed: Sep. 18, 2018

(65) Prior Publication Data
US 2019/0019515 A1    Jan. 17, 2019

Related U.S. Application Data

(63) Continuation of application No. PCT/KR2017/004626, filed on May 1, 2017.

(30) Foreign Application Priority Data

Apr. 29, 2016    (KR) .......................... 10-2016-0053428

(51) Int. Cl.
*G10L 15/22*    (2006.01)
*G10L 15/24*    (2013.01)
(Continued)

(52) U.S. Cl.
CPC .............. *G10L 15/22* (2013.01); *G06F 3/011* (2013.01); *G06F 3/017* (2013.01); *G06F 3/0304* (2013.01);
(Continued)

(58) Field of Classification Search
CPC ..................................................... G10L 15/20
(Continued)

(56) References Cited

U.S. PATENT DOCUMENTS 5,619,709 A * 4/1997 Caid ....................... G06F 16/58
715/209
6,243,683 B1    6/2001 Peters
(Continued)

FOREIGN PATENT DOCUMENTS

EP    2741232 A3    4/2016
JP    2000-338895 A    12/2000
(Continued)

OTHER PUBLICATIONS

International Search Report for PCT/KR2017/004626 filed May 1, 2017.

*Primary Examiner* — Huyen X Vo
*Assistant Examiner* — Timothy Nguyen
(74) *Attorney, Agent, or Firm* — Dinsmore & Shohl LLP; Yongsok Choi, Esq.

(57) ABSTRACT

A control method for allowing a user to specify an electronic device and switch it to a speech recognition mode is provided. With the optimum control method and the electronic device utilizing the method, a voice command may be transmitted to the electronic device more quickly and effectively regardless of the circumstances, and the electronic device may be specified through gesture recognition to enable transmission of the voice command, so that the voice command may be effectively executed without needing a user to learn or memorize a name or the like of the electronic device in advance for speech recognition. Further, it is possible to more accurately recognize a gesture that is a preliminary step for transmitting a voice command to the electronic device, thereby improving the recognition rate and preventing malfunction.

21 Claims, 10 Drawing Sheets

(51) Int. Cl.
  *H04L 12/28* (2006.01)
  *G06F 3/03* (2006.01)
  *G06F 3/16* (2006.01)
  *G06F 3/01* (2006.01)

(52) U.S. Cl.
  CPC .............. *G06F 3/165* (2013.01); *G06F 3/167* (2013.01); *G10L 15/24* (2013.01); *H04L 12/282* (2013.01); *G06F 2203/0381* (2013.01); *G10L 2015/223* (2013.01)

(58) Field of Classification Search
  USPC .......................................................... 704/275
  See application file for complete search history.

(56) References Cited

U.S. PATENT DOCUMENTS

| | | | | |
|---|---|---|---|---|
| 2002/0181773 | A1* | 12/2002 | Higaki | G06K 9/00335 382/190 |
| 2009/0150160 | A1* | 6/2009 | Mozer | G06F 3/011 704/275 |
| 2011/0313768 | A1* | 12/2011 | Klein | G06F 3/167 704/251 |
| 2012/0304067 | A1 | 11/2012 | Han et al. | |
| 2013/0010207 | A1* | 1/2013 | Valik | G06F 3/017 348/734 |

FOREIGN PATENT DOCUMENTS

| | | |
|---|---|---|
| JP | 2011-039765 A | 2/2011 |
| JP | 4992218 B2 | 8/2012 |
| JP | 2015175983 A | 10/2015 |
| KR | 1020050090265 A | 9/2005 |
| KR | 1020100102354 A | 9/2010 |
| KR | 1020120054743 A | 5/2012 |
| KR | 2012-0132337 A | 12/2012 |
| KR | 1020140109020 A | 9/2014 |
| KR | 101453815 B1 | 10/2014 |
| KR | 1020150027608 A | 3/2015 |
| KR | 2015-0065643 A | 6/2015 |

* cited by examiner

FIG. 7

| 1st Body Coordinate Point | Valid Time ($\Delta t_n$) | Threshold Conditions | Direction Difference (a°) between Motion Vector ($\vec{M}$) and Connection Vector ($\vec{S}$) | Magnitude of Motion Vector($|\vec{M}|$) | Magnitude of Connection Vector($|\vec{S}|$) | Hand Pose | Command Vector |
|---|---|---|---|---|---|---|---|
| One Eye | 0.2sec | 1st Threshold Condition | -40° < a° < 40° | 3cm or greater | | 1 finger (Index) | 1st Command Vector (Pointing) |
| | | 2nd Threshold Condition | - | less than 1 cm | 10 – 100cm | 1 finger (Index) | |
| Nose or Mouth | 0.2sec | 1st Threshold Condition | 140° < a° < 220° | 3cm or greater | | 1 finger (Index) | 2st Command Vector (Hush) |
| | | 2nd Threshold Condition | | less than 1 cm | less than 5 cm | 1 finger (Index) | |

FIG. 8

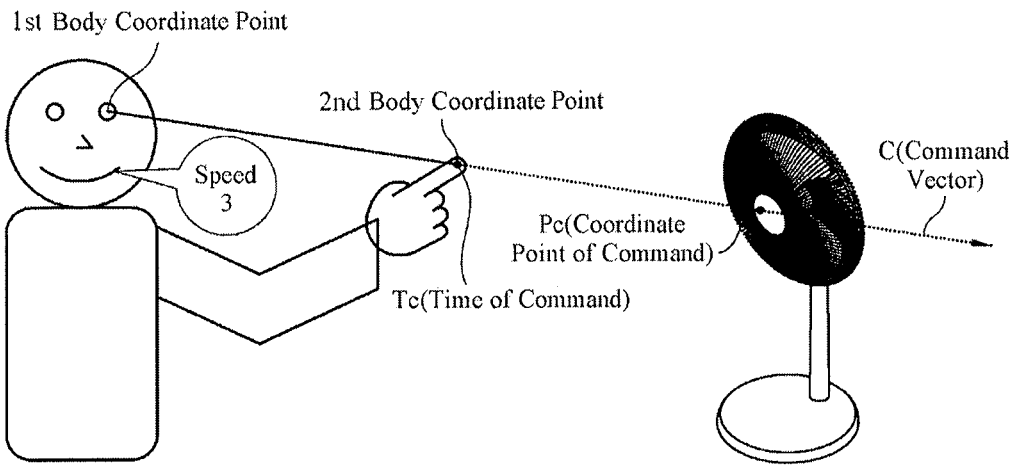

OPTIMUM CONTROL METHOD BASED ON MULTI-MODE COMMAND OF OPERATION-VOICE, AND ELECTRONIC DEVICE TO WHICH SAME IS APPLIED

CROSS-REFERENCE TO RELATED APPLICATION(S)

This application is a continuation application of Patent Cooperation Treaty (PCT) international application Serial No. PCT/KR2017/004626, filed on May 1, 2017, which claims priority to Korean Patent Application Serial No. 10-2016-0053428, filed on Apr. 29, 2016. The entire contents of PCT international application Serial No. PCT/KR2017/004626 and Korean Patent Application Serial No. 10-2016-0053428 are hereby incorporated by reference.

FIELD OF THE INVENTION

The present invention relates to an optimum control method based on a gesture-speech multi-mode command, and an electronic device to which the method is applied, and more specifically, to a control method in which a trigger for allowing a user to specify an electronic device and switch it to a speech recognition mode is processed with gesture recognition, and a voice command may be transmitted to the specified electronic device, and an electronic device to which the method is applied.

BACKGROUND

In recent years, attempts have been increasingly made to enable electronic appliances used in daily life to recognize speeches of users and operate accordingly. Particularly, the speech recognition function is increasingly applied to, for example, washing machines or dishwashers which provide convenience in life by reducing household labor in modern living, and televisions or audio systems which occupy important parts in culture or education related fields such as leisure activity or information retrieval.

The speech recognition is roughly performed as follows. First, a speech recognition algorithm installed on an electronic device sequentially performs a voice detection process, a feature extraction process, and a matching process. When a speech signal of a user is inputted through a microphone, an analog-to-digital (A/D) converter converts it into a digital signal. The converted digital speech signal is divided into short-term signals (i.e., frames), and only a speech section in which the user actually utters a speech, among the inputted speech signal, is detected using energy of each frame, a zero-crossing rate, duration information, and the like. Thereafter, features of frames for the detected speech section are extracted to generate a test pattern of the inputted speech, and the test pattern is compared with each of reference patterns stored in a reference data memory to output the reference pattern having the features most similar to those of the test pattern as the recognized speech. Here, when a reference pattern of a speech signal is stored in the reference data memory, the features of a frame corresponding to a speech section are extracted to form and store the reference pattern in the reference data memory. The above operation is repeatedly performed for each speech signal to be recognized, so that the reference patterns are stored in a database in the reference data memory.

However, a process of distinguishing between a voice command and a normal speech (e.g., a conversation) of the user is required for speech recognition. In this regard, a method has been conventionally used in which a starting point of speech recognition is specified by a touch action or an action of pressing a button, and an electronic device to execute a command through the speech recognition is specified, and then a voice command is inputted so that an operation of the target electronic device is performed. Korean Registered Patent Publication No. 10-1000925 (titled, "Method of controlling digital photographing apparatus wherein voice recognition is efficiently utilized, and digital photographing apparatus using the method") has suggested a digital photographing apparatus having a two-stage shutter release button, which performs automatic focusing or photographing in response to a voice command of a user according to a push state of the shutter release button.

As described above, with a button input for speech recognition, home appliances may be generally controlled through a remote control in a home network system, and an operation may be performed using an electronic key in an outdoor mobility device such as an automobile. However, in the case of a home appliance such as a television, functions to be performed by a wireless remote control are increasing more and more, and the number of buttons of the wireless remote control is greatly increased, so that a user tends to feel a great deal of inconvenience when using the remote control for a speech recognition operation. Particularly, the increased complexity of the remote control functions may aggravate the inconvenience to children or elderly/infirm people, and it may be difficult to use the speech recognition function with the remote control when the user forgets where the remote control is kept or loses the remote control. There is also an environmental problem that batteries for powering the remote control need to be replaced when they reach the end of their life.

In order to solve the problems of the button input method, a method has been conventionally used in which a user specifies an electronic device to be used with a speech, and then issues a command through speech recognition. In the above method, an electronic device to perform speech recognition is registered with a predetermined phrase such as "Hey Siri", "Alexa", or "Cortana", and when the user specifies the electronic device through a speech, the specified electronic device notifies the user to specify a starting point of speech recognition through sound or LEDs (Light Emitting Diodes). Then, the user utters a speech to input a command (e.g., On, Off, Up, Down, or the like) and an electronic device to execute the command (e.g., TV, audio system, lighting, fan, thermostat, or the like). However, the method in which the user specifies an electronic device to be controlled and issues a voice command using a speech as above is inconvenient because a lot of time and procedures are required to specify the electronic device and input the speech. Thus, it is necessary to conceive a method for effectively processing the speech recognition.

Particularly, a conventional speech recognition system requires a relatively large amount of calculation in order to recognize the frequencies of an inputted voice command and search a command. Voice commands are predetermined mainly at the time of shipment of electronic devices, and are composed of simple commands such as "Power on" or "Volume up". However, it is difficult to accurately recognize the predetermined voice commands by distinguishing between various timbre and pronunciations of various users. When there are a large number of voice commands, the user has to inconveniently memorize all the voice commands. Further, when one type of electronic device is exported to various countries, voice commands should be disadvantageously pre-registered in the language of the corresponding country. Thus, there is a need to overcome the disadvantages of high failure rates of voice command recognition and demands for high-end hardware and complex algorithms for speech recognition.

In order to solve the above problems, a method has been conventionally in which a speech and a gesture of a user are simultaneously recognized to control an electronic device. Korean Registered Patent Publication No. 10-1046022 (titled, "Remote controller using motion of human body and human voice") discloses a method for recognizing a gesture of a user to control a mouse pointer displayed on a display device such as a television, and Korean Laid-Open Patent Publication No. 10-2012-0054743 (titled, "Method for controlling using voice and gesture in multimedia device and multimedia device thereof") discloses a method for recognizing a speech and a gesture of a user together and performing an operation desired by the user when the features of the speech and gesture are all matched.

However, the gesture recognition generally needs to identify a gesture that a user spatially makes, and it is difficult to distinguish whether the user's gesture is a gesture for controlling an electronic device or an ordinary motion. Further, the prices of gesture recognition modules used for the gesture recognition are high. Thus, there is a disadvantage in that the universal application of the gesture recognition function for the control of electronic devices has a low utility value in terms of efficiency and economy. In addition, a common pose or gesture (e.g., movement of a body part) is relatively well recognized when the user is facing a camera, but the recognition rate is reduced when the position and direction of the camera and user are changed. Thus, there is a disadvantage in that in a space where various types of electronic appliances and objects (e.g., belonging to a home network) are present, a plurality of cameras should be provided for each of the electronic appliances and objects.

Therefore, when gesture recognition and speech recognition functions are performed at the same time, it is necessary to distinguish between a part processed by the gesture recognition and a part processed by the speech recognition, so that an optimum process may be implemented in consideration of the comprehensive aspects including the user's usability and economic efficiency.

SUMMARY OF THE INVENTION

The present invention has been conceived to solve the above problems, and one object of the invention is to provide an optimum control method and an electronic device utilizing the control method, by processing a trigger event, which is a preliminary step for allowing a user to specify an electronic device and issue a voice command, with gesture recognition, and transmitting the voice command to the specified electronic device.

In order to achieve the above object of the invention, an optimum control method based on a gesture-speech multi-mode command according to the invention may comprise the steps of: receiving gesture information of a user through a gesture recognition device; detecting a first body coordinate point and a second body coordinate point of the user from the gesture information; detecting a connection vector extending from the first body coordinate point to the second body coordinate point, or a motion vector of the second body coordinate point; and switching to a speech recognition mode for recognizing a voice command of the user, when a characteristic value of the motion vector satisfies a predetermined threshold condition.

The first body coordinate point of the user may be a coordinate point of a location of an eye, a nose, or a mouth of the user.

The second body coordinate point of the user may be a coordinate point of a location of a fingertip of the user.

The connection vector may be information on a straight line extending from the first body coordinate point to the second body coordinate point.

The motion vector may be a vector connecting the second body coordinate point of the user from a first point of time to a second point of time.

The threshold condition may have a different range for the characteristic value of the motion vector depending on the connection vector.

In the optimum control method based on a gesture-speech multi-mode command according to the invention, when switching to the speech recognition mode is made, recognition of the voice command of the user may be started before or after a specific point of time.

The optimum control method based on a gesture-speech multi-mode command according to the invention may further comprise the step of defining an extension line of the first body coordinate point and the second body coordinate point as a command vector, and executing the voice command of the user when a characteristic value of the command vector satisfies a predetermined execution condition.

The command vector may be detected when the characteristic value of the motion vector satisfies a first threshold condition and then satisfies a second threshold condition within a valid time.

After switching to the speech recognition mode, the optimum control method based on a gesture-speech multi-mode command according to the invention may determine an area in which the voice command of the user is to be executed, according to a field of command formed by the second body coordinate point of the user from the second body coordinate point.

The field of command may include a spatial area formed by extension lines between the first body coordinate point of the user and points that the second body coordinate point of the user forms in a vertical or horizontal direction, with respect to a direction faced by the first body coordinate point.

The optimum control method based on a gesture-speech multi-mode command according to the invention may further comprise the step of controlling an operation of a peripheral electronic device according to the voice command.

The step of controlling the operation of the peripheral electronic device according to the voice command may comprise the step of switching the peripheral electronic device to a speech recognition mode to enable recognition of the voice command of the user, when the characteristic value of the motion vector satisfies a first threshold condition and then satisfies a second threshold condition within a valid time.

Further, an electronic device based on a gesture-speech multi-mode command according to the invention may comprise: a gesture recognition unit configured to recognize gesture information of a user; a speech recognition unit configured to recognize a voice command of the user; a coordinate point detection unit configured to detect a first body coordinate point and a second body coordinate point of the user from the gesture information recognized by the gesture recognition unit; a vector detection unit configured to detect a connection vector extending from the first body coordinate point to the second body coordinate point, or a motion vector of the second body coordinate point; and a control unit configured to switch to a speech recognition mode for recognizing the voice command of the user, when a characteristic value of the motion vector satisfies a first threshold condition and then satisfies a second threshold condition within a valid time.

The gesture recognition unit may comprise a camera module and a motion sensor.

The speech recognition unit may comprise a microphone and a voice sensor.

The electronic device based on a gesture-speech multi-mode command according to the invention may further comprise a control unit configured to control an operation of a peripheral electronic device according to the voice command of the user inputted through the speech recognition unit.

The electronic device based on a gesture-speech multi-mode command according to the invention may switch the peripheral electronic device to a speech recognition mode to enable recognition of the voice command of the user, when the characteristic value of the motion vector satisfies the first threshold condition and then satisfies the second threshold condition within the valid time.

With the optimum control method according to the embodiments of the invention and the electronic device utilizing the method, a voice command may be transmitted to the electronic device more quickly and effectively regardless of the circumstances, and the electronic device may be specified through gesture recognition to enable transmission of the voice command, so that the voice command may be effectively executed without needing a user to learn or memorize a name or the like of the electronic device in advance for speech recognition. Further, it is possible to more accurately recognize a gesture that is a preliminary step for transmitting a voice command to the electronic device, thereby improving the recognition rate and preventing malfunction.

BRIEF DESCRIPTION OF THE DRAWINGS

FIG. 7 is a table illustrating conditions for triggering a speech recognition function of an electronic device, with an optimum control method based on a gesture-speech multi-mode command according to one embodiment of the invention.

FIG. 8 is a diagram illustrating a situation in which an electronic device is controlled using a command vector after a trigger for speech recognition, with an optimum control method based on a gesture-speech multi-mode command according to another embodiment of the invention.

DETAILED DESCRIPTION

The technical terms used herein are not intended to limit the present invention but to describe specific embodiments of the invention. The singular forms used herein include plural forms as well, provided that the phrases do not expressly have the opposite meanings. The term, "comprising" used herein means specifying particular properties, areas, integers, steps, operations, elements, and/or components, and does not exclude the presence or addition of other particular properties, areas, integers, steps, operations, elements, components and/or groups.

Unless defined otherwise, all terms including technical and scientific terms used herein have the same meanings as commonly understood by those skilled in the art to which the invention pertains. Commonly used terms defined in dictionaries are further interpreted as having meanings consistent with the relevant technical literature and the present disclosure, and are not to be interpreted as having ideal or strictly formal meanings unless defined otherwise.

Hereinafter, preferred embodiments of the present invention will be described in detail with reference to the accompanying drawings.

Figure 1:
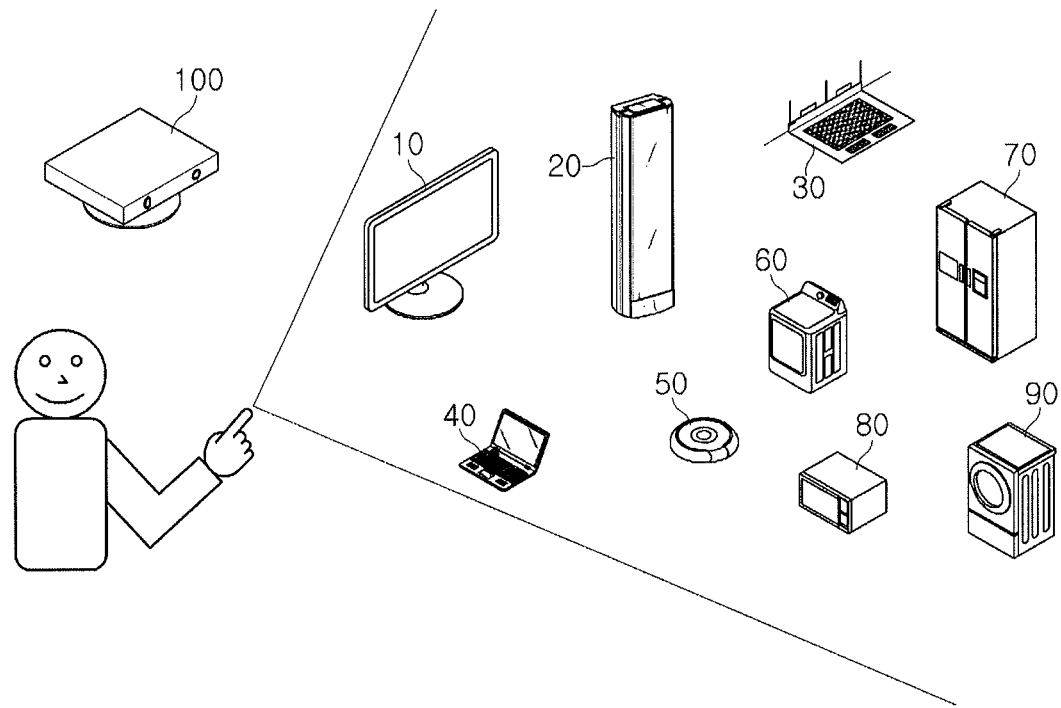
FIG. 1 is a conceptual diagram showing an optimum control method based on a gesture-speech multi-mode command according to one embodiment of the invention.

FIG. 1 is a conceptual diagram showing an optimum control method based on a gesture-speech multi-mode command according to one embodiment of the invention. Referring to FIG. 1, the optimum control method based on a gesture-speech multi-mode command according to the invention may be applied for the control of various home appliances, and may be typically applied to a home network system.

That is, an electronic device 100 according to the invention may be disposed in a certain area of a home network system including a plurality of home appliances. The home network system may include a plurality of devices connected through a wired or wireless network. Such a network is configured such that all electrical and electronic devices used in the home are wired or wirelessly connected to each other and bidirectional communication therebetween is enabled. The network may employ the wired or wireless Internet so that information may be shared between the electronic devices including a television 10, an air conditioner 20, a cooking appliance 30, a notebook 40, a robot cleaner 50, a dishwasher 60, a refrigerator 70, a microwave oven 80, and a washing machine 90 though the network. The wired network may typically employ a Home PNA (Phoneline Networking Alliance) scheme using conventional telephone lines, an IEEE 1394 scheme, a power line scheme, and the like. The wireless network may typically employ a home RF (radio frequency) scheme, a Bluetooth scheme, an IrDA (Infrared Data Association) scheme, a wireless LAN (WiFi) scheme, and the like. A user may dispose the electronic device 100 according to the invention in the user's home, and may control the home appliances constituting the home network system with gestures and speeches. Further, the electronic device 100 according to the invention may be implemented as a separate device, but the functions of the electronic device 100 may be implemented as embodied in a conventional device such as a home appliance.

Although FIG. 1 illustrates an example of a home network system, it will be apparent that the optimum control method based on a gesture-speech multi-mode command according to the invention may be applied not only in the home but also to electronic devices used outside the home, such as a smart car, a drone, and a digital camera.

Figure 2:
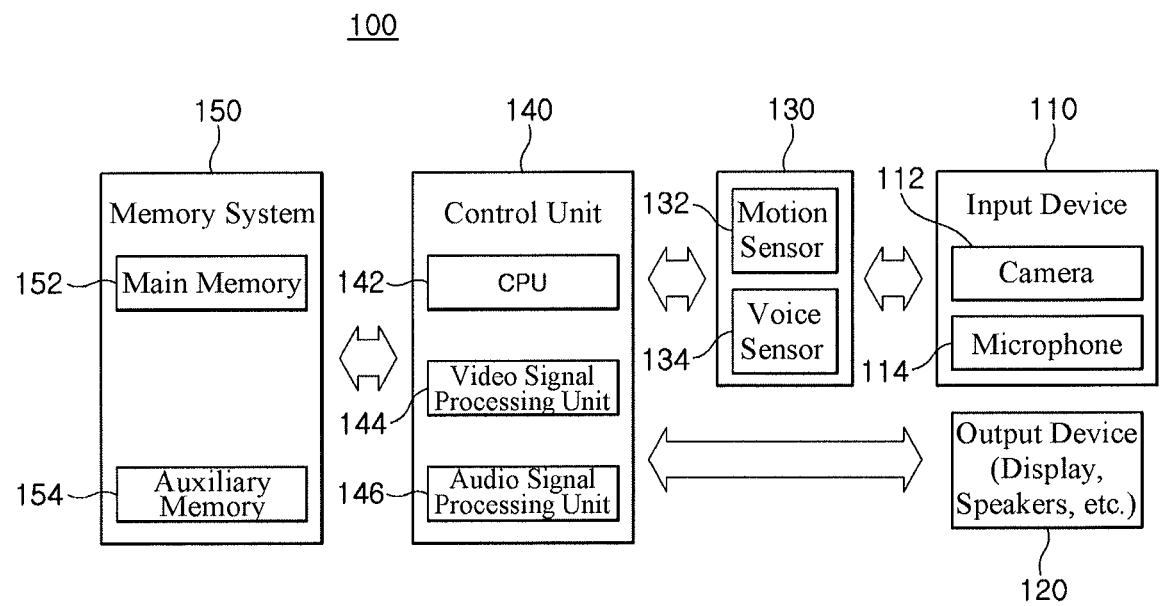
FIG. 2 is a diagram showing the internal configuration of an electronic device to which an optimum control method based on a gesture-speech multi-mode command according to one embodiment of the invention is applied.

FIG. 2 is a diagram showing the internal configuration of an electronic device to which an optimum control method based on a gesture-speech multi-mode command according to one embodiment of the invention is applied. Referring to FIG. 2, the electronic device 100 according to the invention comprises a memory system 150, a control unit 140 connected to the memory system 150 and configured to control operations of the electronic device 100, an input device 110, and an output device 120.

Here, the input device 110 comprises a camera 112 for receiving video information according to a motion of a user, and a microphone 114 for receiving audio information from the user, and may further comprise a device for recognizing a touch of the user such as a touch screen, or various forms of physical transducers such as a conventional mouse or electronic pen. In the case of a smart phone or tablet, the output device 120 may indicate a display for displaying text or images, but may also include a transducer such as a printer or speakers. The display may be configured in various forms such as a liquid crystal display (LCD), a thin film transistor-liquid crystal display (TFT LCD), an organic light-emitting diode (OLED) display, a flexible display, and a three-dimensional (3D) display. When the electronic device 100 is a communication device, a device such as a network interface or modem may be employed as the input device and/or the output device.

A sensor unit 130 is connected to the input device 110, and has a motion sensor 132 for recognizing a motion of the user through the input device 110, and a voice sensor 134 for recognizing a speech signal of the user through the input device 110. When a motion of the user or a speech signal of the user is recognized through the input device 110, the sensor unit 130 provides gesture information or speech information to the control unit 140.

The control unit 140 comprises a central processing unit (CPU) 142 for controlling operations of the electronic device 100, a video signal processing unit 144 for determining a direction and magnitude of the user's gesture recognized through the camera 112 and the motion sensor 132, and an audio signal processing unit 146 for determining a speech pattern from the user's digital speech signal transmitted through the voice sensor 134. The video signal processing unit 144 identifies an area where a motion occurs in the user's video signal inputted from the camera 112, and determines a direction and magnitude of the area where the motion occurs as a motion vector. Preferably, when the determined magnitude of the motion vector is less than a predetermined reference value, the video signal processing unit 144 may determine that the motion is not a gesture intended for remote control of the electronic device 100, and may ignore the motion. When the determined magnitude of the motion vector is greater than the predetermined reference value, the video signal processing unit 144 may determine that the motion is a gesture intended for remote control of the electronic device 100, so that a designated command may be executed. In general, the speech signal inputted through the microphone 114 is an analog signal, and thus an analog-to-digital converter (ADC) (not shown) may be provided so that the speech signal may be inputted to the voice sensor 134 and the audio signal processing unit 146. The audio signal processing unit 146 determines a speech pattern from the inputted speech signal and then compares it with speech patterns pre-stored in the memory system 150, so that when there is a matching speech pattern, a command corresponding to the speech pattern may be executed.

Further, the control unit 140 may further comprise a register for temporarily storing data and instructions, and a controller for controlling operations of the electronic device 100. Meanwhile, the CPU 142 may be a processor constructed from various architectures such as Alpha of Digital, MIPS of MIPS Technology, NEC, IDT, and Siemens, x86 of Intel, Cyrix, AMD, and Nexgen, and PowerPC of IBM and Motorola.

In general, the memory system 150 comprises a high-speed main memory 152 in the form of a storage medium such as a random access memory (RAM), a read only memory (ROM), a static random access memory (SRAM), an electrically erasable programmable read-only memory (EEPROM), and a programmable read-only memory (PROM); an auxiliary memory 154 in the form of a long-term storage medium such as a floppy disk, a hard disk, a tape, a CD-ROM, a flash memory, a micro type multimedia card, a card type memory (e.g., SD or XD memory); and a device for storing data using an electric, magnetic, optical, or other storage medium. Further, the main memory 152 may comprise a video display memory for displaying images through a display device. It will be apparent to those skilled in the art that the memory system 150 may have various forms and various storage capabilities.

Accordingly, the gesture or speech signal transmitted from the user through the input device 110 is transmitted to the control unit 140 through the sensor unit 130, and the control unit 140 compares the motion vector information determined therefrom to reference values of the gesture and speech signals pre-stored in the memory system 150 to judge whether there is a match, and judges that the user has remote control authority when there is a match, so that a designated command may be executed.

In the technical field of the invention, the electronic device 100 to which the optimum control method based on a gesture-speech multi-mode command is applied may include an operating system (OS) and at least one application program. The OS is a set of software for controlling the operation and resource allocation of the electronic device 100. The application program is a set of software for performing a task requested by a user, using computer resources available through the OS. The OS and application program reside in the memory system 150. According to experience of those skilled in the art of computer programming, unless described otherwise, the present invention will be described based on the operations performed by the electronic device 100 and the representation symbols for the operations. The operations are performed based on a computer by the OS or suitable application programs. Further, the operations and functions include processing of the control unit 140 to cause conversion or interruption of electrical signals such as data bits, alteration of the operations of the electronic device 100, and management of data bit signals stored in memory areas in the memory system 150. The memory areas in which the data bit signals are managed are physical areas having electric, magnetic, or optical properties corresponding to the data bits.

The optimum control method based on a gesture-speech multi-mode command according to the invention may be implemented in a home appliance provided in a home network or various other electronic appliances, or may be implemented in a standalone electronic device that is separately installed in a home to control peripheral electronic appliances. When it is implemented in a separate standalone electronic device for controlling voice commands for peripheral electronic appliances, the standalone electronic device may have a wireless communication function for controlling the operations of the electronic appliances within a certain range, and a function for identifying the peripheral electronic appliances.

Figure 3:
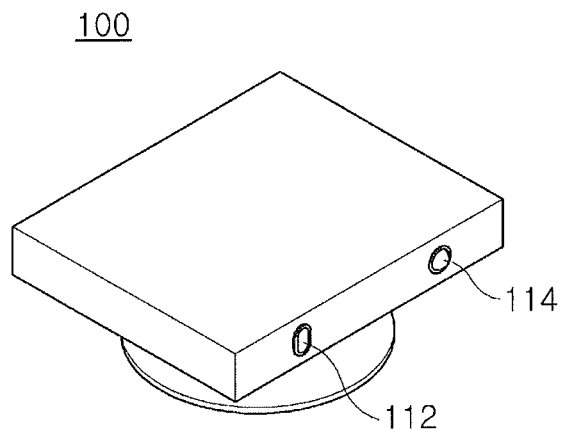
FIG. 3 is an illustrative diagram showing a situation in which an optimum control method based on a gesture-speech multi-mode command according to one embodiment of the invention is applied to an electronic appliance.

FIG. 3 is an illustrative diagram showing a situation in which an optimum control method based on a gesture-speech multi-mode command according to one embodiment of the invention is applied to an electronic appliance. Referring to FIG. 3, the electronic device 100 to which the optimum control method based on a gesture-speech multi-mode command according to the invention is applied may be implemented as a home appliance such as a television, or may be implemented as a separate control module for controlling home appliances.

The electronic device 100 according to the invention may have the camera 112 for recognizing a gesture of a user and the microphone 114 for recognizing a speech of the user. Typically, the camera 112 may include a lens for condensing incident light and a sensor such as a CCD (Charge Coupled Device) or a CMOS (Complementary Metal-Oxide Semiconductor) for detecting an image whose focus is formed by the lens and converting the image into an electrical image signal. The microphone 114 may include an analog-to-digital converter (ADC) for converting an analog speech signal inputted from the user into a digital speech signal. When the camera 112 and the microphone 114 are attached to the electronic device 100 to which the optimum control method based on a gesture-speech multi-mode command according to the invention is applied, they may be installed at the top of a TV frame, for example, for better recognition of the user's gesture or speech. Accordingly, the camera 112 may more easily detect a motion of the user who desires to remotely control the electronic device 100 in front of the electronic device 100. The motion of the user may be made in various ways, and may be a finger motion of the user indicating the electronic device 100 to be remotely controlled. Since a human finger may provide sufficient magnitude and directionality even with a simple motion, a body motion detected by the camera 112 installed in the electronic device 100 according to the invention may preferably be targeted for a finger motion of the user.

Figure 4:
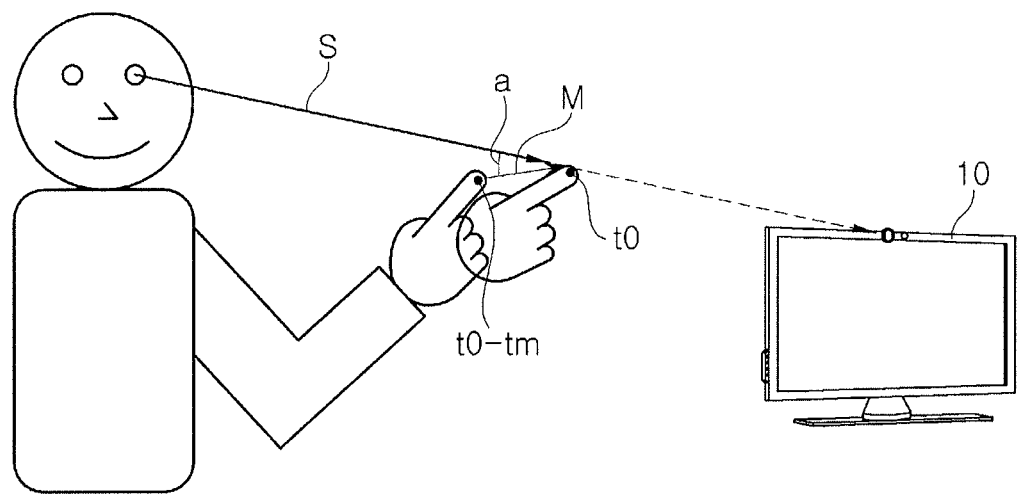
FIG. 4 is an illustrative diagram showing an optimum control method based on a gesture-speech multi-mode command according to one embodiment of the invention.

FIG. 4 is an illustrative diagram showing an optimum control method based on a gesture-speech multi-mode command according to one embodiment of the invention. Referring to FIG. 4, with respect to a specific device 10 at a remote location, a user may control the operation of the device 10 through a gesture using a finger, as will be described below. As discussed above, the optimum control method based on a gesture-speech multi-mode command according to the invention may be embodied in a general appliance, or may be embodied in a separate device for controlling general appliances.

First, a straight line from one eye of the user to a finger of the user serves a connection vector S. In this state, when the user moves the finger up to the connection vector S, a motion vector M corresponding to a straight line along which the finger is moved is generated. Here, a magnitude of the connection vector S, a time (tm) for which the user moves the finger, a magnitude of the motion vector M, and an angle (a) spatially formed by the connection vector S and the motion vector M may be calculated. When the values of the magnitude of the connection vector S, the time (tm) for which the user moves the finger, the magnitude of the motion vector M, and the angle (a) spatially formed by the connection vector S and the motion vector M satisfy a first threshold condition stored in the electronic device 100 according to the invention, and then satisfy a second threshold condition within a valid time, a speech recognition function of the electronic device 100 according to the invention is triggered. Here, a reference body coordinate point may be selected as one of the user's body features, and reference values for the magnitude of the connection vector S, the time (tm) for which the finger is moved, the magnitude of the motion vector M, and the angle (a) formed by the connection vector S and the motion vector M may be differently defined depending on the type of the body coordinate point.

Figure 5:
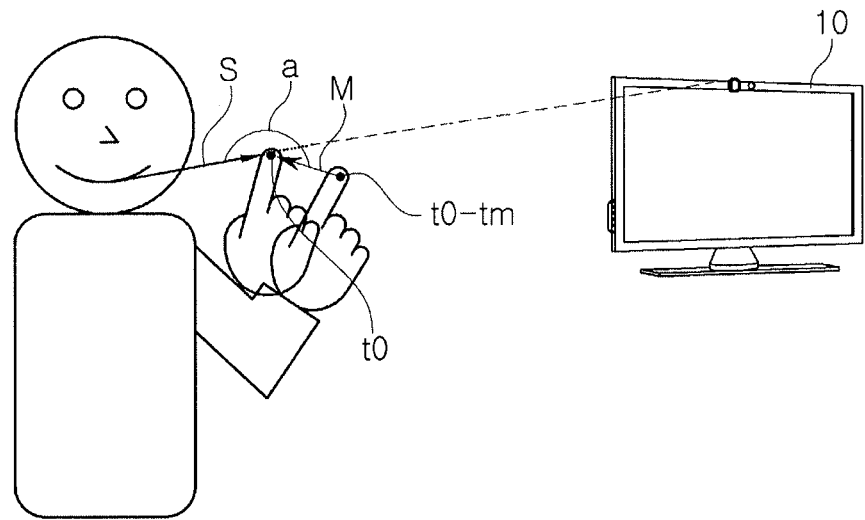
FIG. 5 is an illustrative diagram showing an optimum control method based on a gesture-speech multi-mode command according to another embodiment of the invention.

FIG. 5 is an illustrative diagram showing an optimum control method based on a gesture-speech multi-mode command according to another embodiment of the invention. Referring to FIG. 5, a straight line from a mouth of a user to a finger of the user serves as a connection vector S. In this state, when the user moves the finger, a motion vector M corresponding to a straight line along which the finger is moved is generated. Here, a magnitude of the connection vector S, a time (tm) for which the user moves the finger, a magnitude of the motion vector M, and an angle (a) spatially formed by the connection vector S and the motion vector M may be calculated. When the calculated values satisfy a first threshold condition stored in the electronic device 100 according to the invention, and then satisfy a second threshold condition within a valid time, a speech recognition function of the electronic device 100 is triggered.

Figure 6:
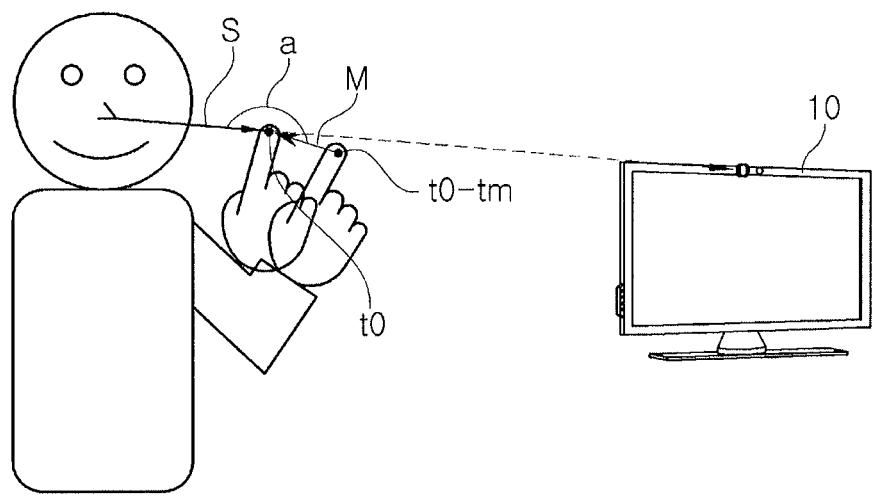
FIG. 6 is an illustrative diagram showing an optimum control method based on a gesture-speech multi-mode command according to yet another embodiment of the invention.

FIG. 6 is an illustrative diagram showing an optimum control method based on a gesture-speech multi-mode command according to yet another embodiment of the invention. Referring to FIG. 6, a straight line from a nose of a user to a finger of the user serves as a connection vector S. In this state, when the user moves the finger, a motion vector M corresponding to a straight line along which the finger is moved is generated. Accordingly, a magnitude of the connection vector S, a magnitude of the motion vector M, a time (tm) for which the user moves the finger, an angle (a) spatially formed by the connection vector S and the motion vector M, and a reference time point (t0) are determined in the same manner as the processes discussed in connection with FIGS. 4 and 5.

Referring to FIG. 7, when a user defines one eye as a first body coordinate point and a fingertip as a second body coordinate point, it is considered that a first threshold condition is satisfied if a hand pose (HP) is to spread one index finger, a magnitude of the motion vector M is 3 cm or greater as the fingertip is moved for 0.1 second, and an angle spatially formed by the motion vector M and the connection vector S is between −40 degrees and 40 degrees.

It is considered that a second threshold condition is satisfied and a first command vector is detected if the hand pose (HP) is to spread one index finger, the magnitude of the motion vector M is less than 1 cm as the fingertip is moved for 0.1 second, and the magnitude of the connection vector S is between 10 cm and 100 cm, within a valid time of 0.2 seconds from the above point of time.

When the user defines a nose or mouth as a first body coordinate point and a fingertip as a second body coordinate point, it is considered that a first threshold condition is satisfied if the hand pose (HP) is to spread one index finger, the magnitude of the motion vector M is 3 cm or greater as the fingertip is moved for 0.1 second, and the angle spatially formed by the motion vector M and the connection vector S is between 140 degrees and 220 degrees.

It is considered that a second threshold condition is satisfied and a second command vector is detected if the hand pose (HP) is to spread one index finger, the magnitude of the motion vector M is less than 1 cm as the fingertip is moved for 0.1 second, and the magnitude of the connection vector S is less than 5 cm, within a valid time of 0.2 seconds from the above point of time.

It is apparent that these conditions may be changed and defined with various values.

As described above, when the connection vector S from a body coordinate point of the user to a finger, the magnitude of the motion vector M for the finger, the time for which the finger is moved, and the angle (a) between the connection vector S and the motion vector M satisfy a first threshold condition and then satisfy a second threshold condition within a valid time, the electronic device 100 is switched to a mode for recognizing the user's speech, and then recognizes a speech signal inputted by the user and executes a command corresponding to a result of the recognition.

Therefore, according to the optimum control method based on a gesture-speech multi-mode command according to the invention, a user may trigger a speech recognition function of a specific electronic device with a simple gesture even when there are ambient noises, so that a voice command may be effectively executed. Further, an electronic device utilizing the optimum control method based on a gesture-speech multi-mode command according to the invention may use a gesture of a user as a trigger means for speech recognition, and use a speech of the user after a speech recognition function is triggered, so that a voice command may be effectively executed without needing the user to learn or memorize a name or the like of the electronic device in advance for speech recognition, and the recognition rate of the electronic device may be improved and malfunction of the electronic device may be prevented.

FIG. 8 is a diagram illustrating a situation in which an electronic device is controlled using a command vector after a trigger for speech recognition, with an optimum control method based on a gesture-speech multi-mode command according to another embodiment of the invention. FIG. 8 shows a situation in which a user triggers a specific electronic device into a mode for speech recognition through any one of the processes of FIGS. 5 to 7. Thus, the electronic device has already been switched to the mode for recognition of the user's speech. Here, the user may issue a voice command without any additional gesture, but if there are several peripheral electronic devices, it is possible to specify only one electronic device and issue a voice command thereto. To this end, the user may define an extension line connecting a body coordinate point (one eye in this case) and a finger as a command vector C, with respect to the electronic device switched to the speech recognition mode, and may cause only the electronic device on the extension line of the command vector C to execute the voice command of the user.

FIG. 8 illustrates a situation in which a user specifies only one electronic device among several electronic devices and issues a voice command thereto. Conversely, it is also possible that the user issues a voice command to electronic devices in a certain area all at once.

Figure 9:
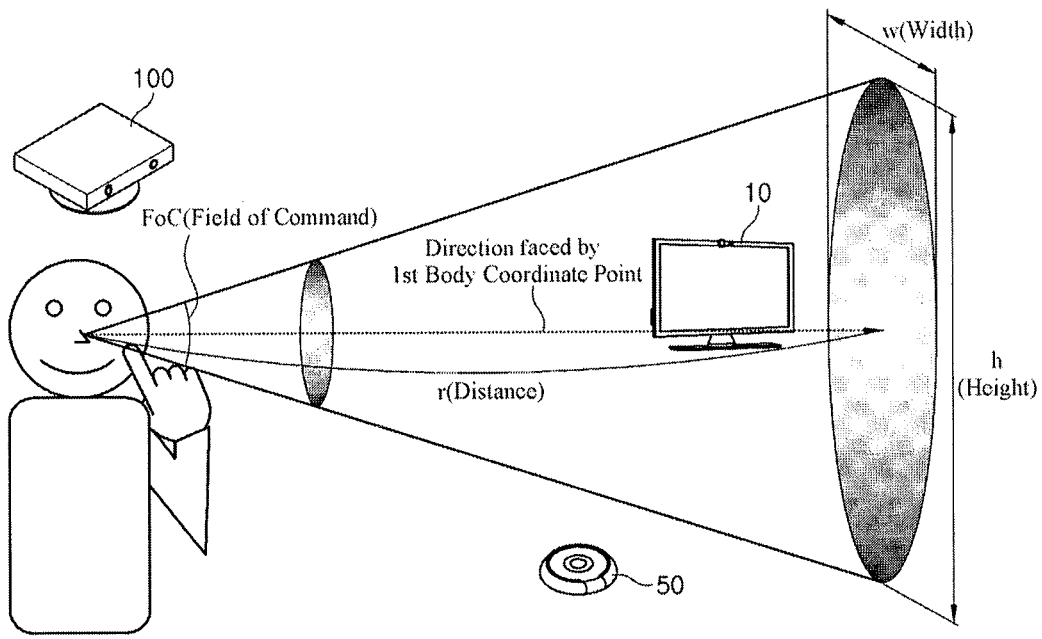
FIG. 9 is a diagram illustrating a situation in which a user issues a voice command to electronic devices in a certain area, with an optimum control method based on a gesture-speech multi-mode command according to yet another embodiment of the invention.
Figure 10:
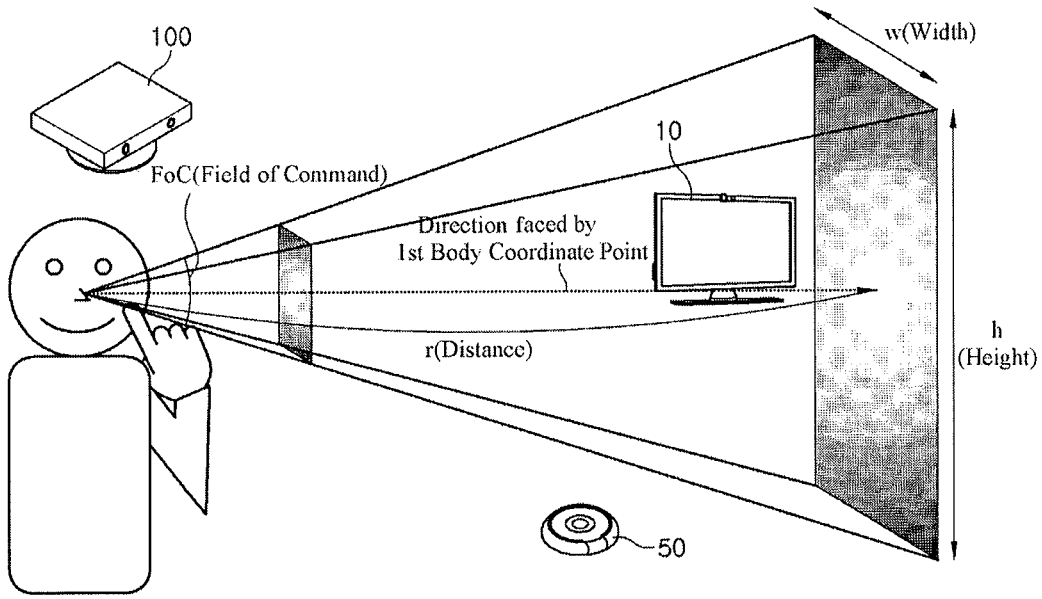
FIG. 10 is a diagram illustrating a situation in which a user issues a voice command to electronic devices in a certain area, with an optimum control method based on a gesture-speech multi-mode command according to yet another embodiment of the invention.
Figure 11:
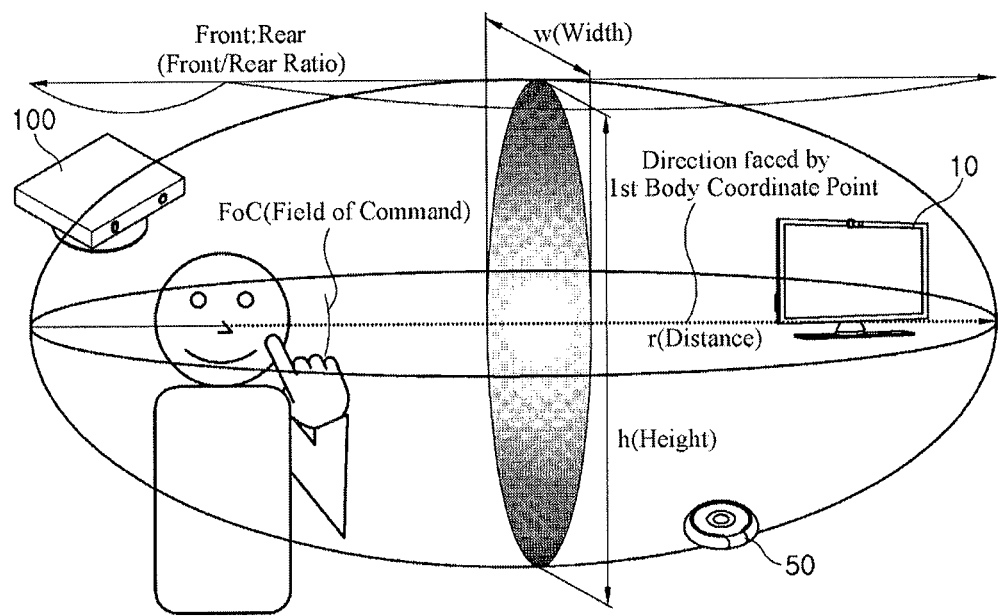
FIG. 11 is a diagram illustrating a situation in which a user issues a voice command to electronic devices in a certain area, with an optimum control method based on a gesture-speech multi-mode command according to yet another embodiment of the invention.

FIGS. 9 to 11 are diagrams illustrating a situation in which a user issues a voice command to home appliances in a certain area using the electronic device 100 according to the invention, with an optimum control method based on a gesture-speech multi-mode command according to yet another embodiment of the invention. Referring to FIGS. 9 to 11, it is assumed that the user defines his/her nose as a body coordinate point. The user may move his/her finger in a vertical or horizontal direction with respect to the electronic device at a time of reference (t0) for triggering a home appliance into a speech recognition mode, or at a time of command (tc) for issuing a voice command after the home appliance is triggered into the speech recognition mode. Thus, the range of the finger moved by the user is extended from the user's body coordinate point (i.e., nose) to a virtual plane to generally form a field of command (FoC) in the shape of a cone. Here, the area of the formed cone may be determined by a distance r from the body coordinate point to the virtual plane, a height h of the plane, and a width w of the plane, and the electronic devices located in this space may be set to collectively execute a voice command of the user. In the case of FIG. 10, a television located in the field of the voice command is to execute the voice command of the user, and a robot cleaner outside the field of the voice command is to ignore the voice command of the user without executing it.

Meanwhile, FIG. 10 shows a situation in which the user defines the field of the voice command in the shape of a pyramid, and FIG. 11 shows a situation in which the user defines the field of the voice command in the shape of an ellipse. While the robot cleaner in FIG. 10 is not located in the field of the voice command, the robot cleaner in FIG. 11 is located in the field of the voice command and is to execute the voice command of the user.

Figure 12:
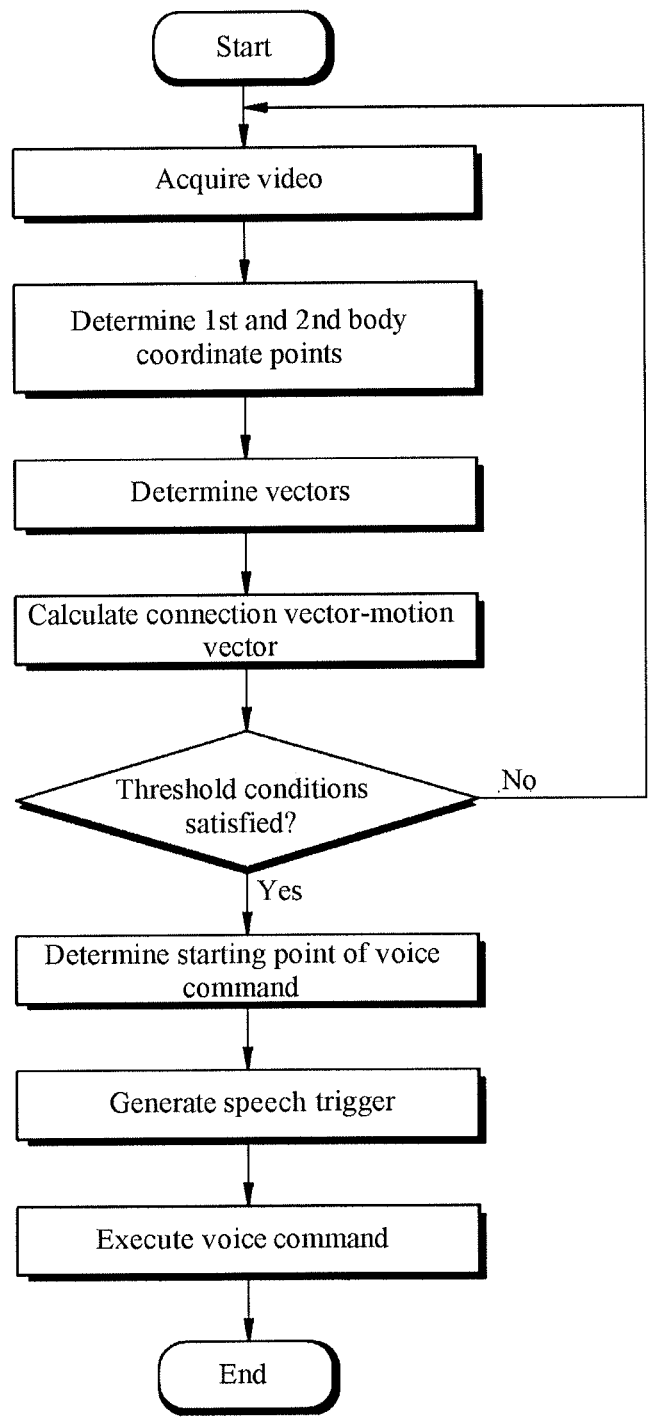
FIG. 12 is a flowchart of an optimum control method based on a gesture-speech multi-mode command according to one embodiment of the invention.

FIG. 12 is a flowchart of an optimum control method based on a gesture-speech multi-mode command according to one embodiment of the invention. Referring to FIG. 12, the electronic device 100 acquires an image of a user in the vicinity through the attached camera 112. When a reference body part (e.g., eye, nose, mouth, or the like) of the user is captured in the image, a body coordinate point thereof is determined, and a connection vector S extending from the body coordinate point to the user's finger and a motion vector M along which the finger is moved are determined. Here, when magnitudes of the connection vector S and the motion vector M, a time (tm) for which the user moves the finger, an angle (a) spatially formed by the connection vector S and the motion vector M, and a reference time point t0 satisfy a threshold condition stored in the memory system 150, it is judged that the user has requested a trigger for a voice command, and a speech trigger is generated to enable voice command recognition. When the user issues a voice command after switching to a speech recognition mode by the speech trigger, the speech of the user is recognized through the attached microphone 114 and the voice command is executed according to a result of the speech recognition. When the user intends to transmit a voice command to a specific electronic device, noises caused by other peripheral electronic devices may disturb the transmission. Therefore, it is possible to generate a command for muting or reducing sound of electronic devices other than the electronic device to which the voice command is to be transmitted.

Figure 13:
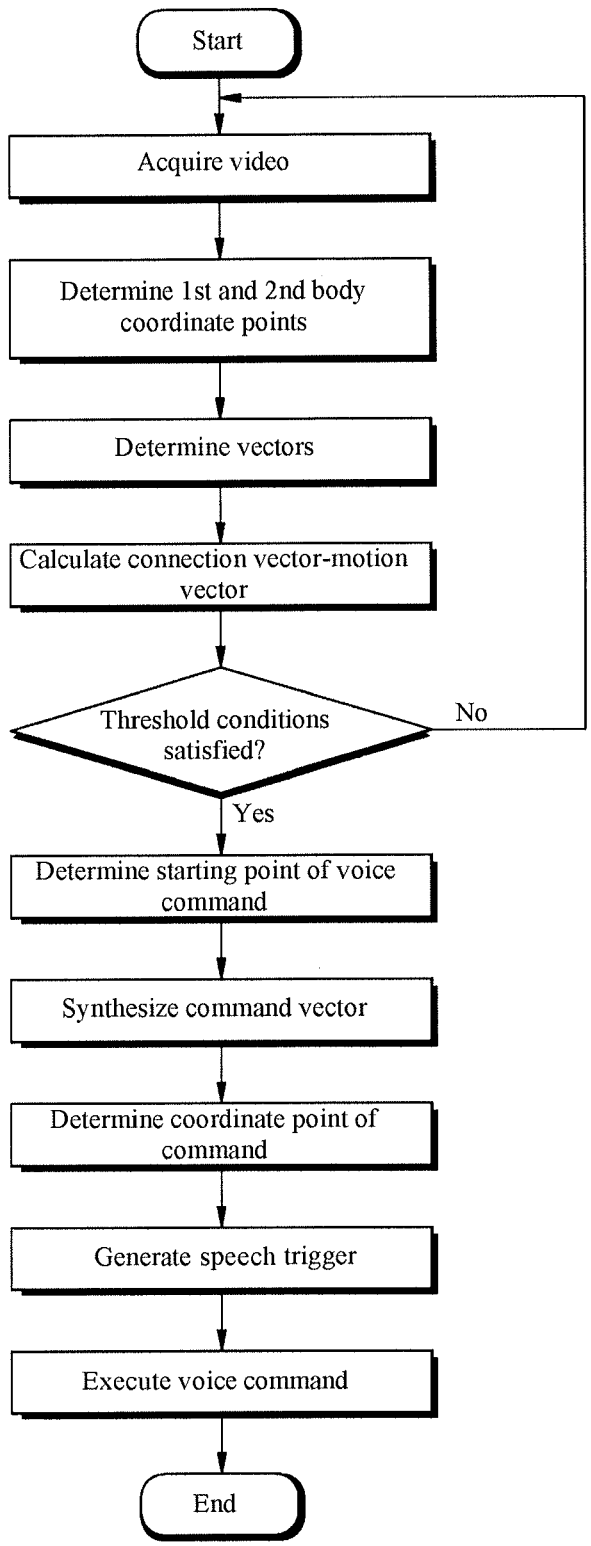
FIG. 13 is a flowchart of an optimum control method based on a gesture-speech multi-mode command according to another embodiment of the invention.

FIG. 13 is a flowchart illustrating how an electronic device is controlled using a command vector after a trigger for speech recognition, with an optimum control method based on a gesture-speech multi-mode command according to another embodiment of the invention. Referring to FIG. 13, when a motion of the finger with respect to the user's body coordinate point is recognized and a threshold condition for a voice command is satisfied, a speech trigger is generated to enable recognition of the user's speech.

At a voice command starting point tc after a predetermined time from the switching to a speech recognition mode by the speech trigger, a voice command of the user is considered together with a command vector C reflecting the user's body coordinate point (e.g., eye, nose, or mouth) and the motion of the finger. Thus, only the electronic device on an extension line of the command vector C is to execute the voice command of the user. As described above, the command vector C may be determined based on a time (tm) for which the user moves the finger after the electronic device is switched to the speech recognition mode, a distance by which the finger is moved, and the like.

Figure 14:
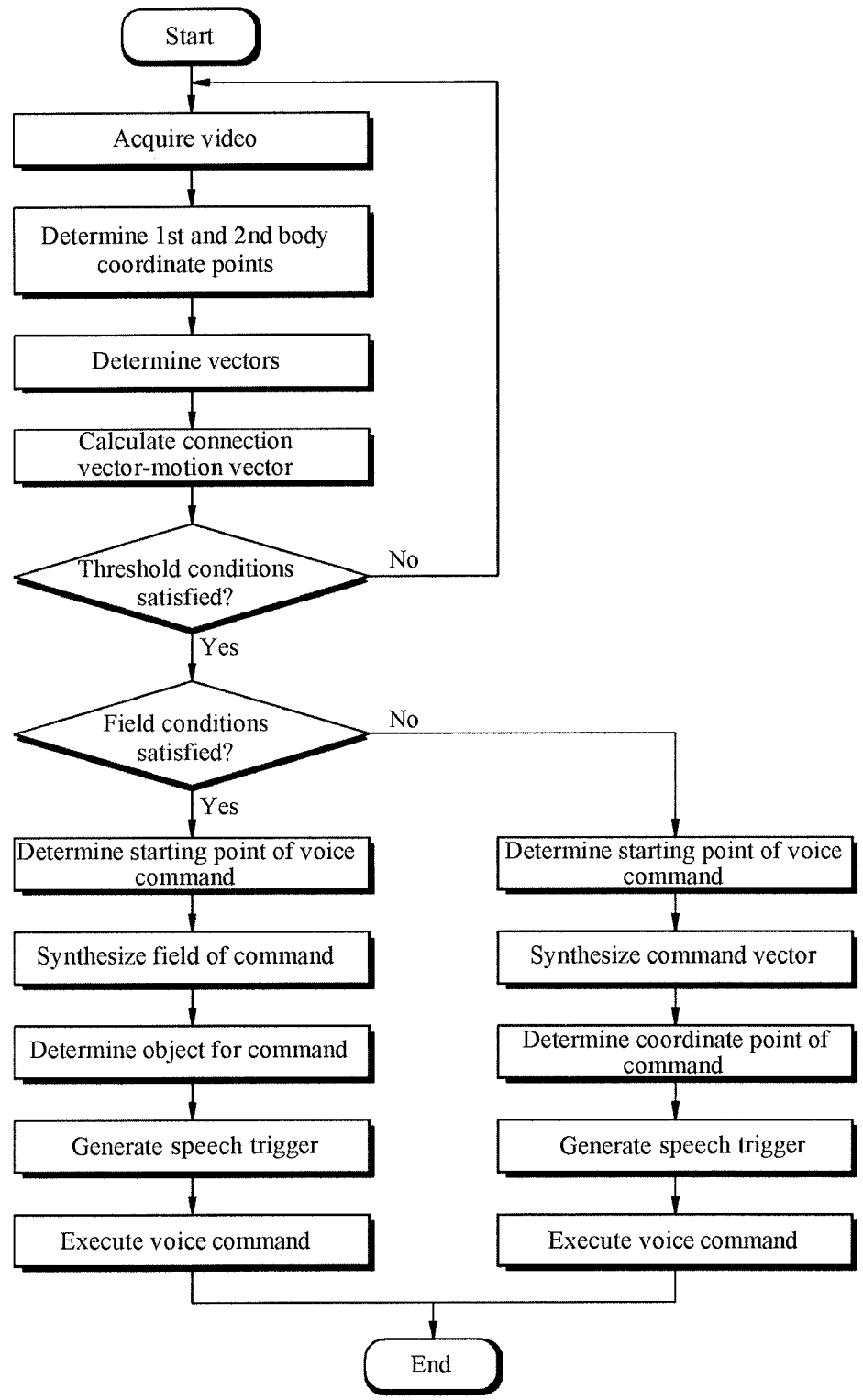
FIG. 14 is a flowchart of an optimum control method based on a gesture-speech multi-mode command according to yet another embodiment of the invention.

FIG. 14 is a flowchart illustrating how a user issues a voice command to electronic devices in a certain area, with an optimum control method based on a gesture-speech multi-mode command according to yet another embodiment of the invention.

A motion of the user's finger is determined with respect to the user's body coordinate point, and a connection vector S between the body coordinate point and the finger and a motion vector M along which the finger is moved are determined. Here, when magnitudes of the connection vector S and the motion vector M, a time (tm) for which the user moves the finger, an angle (a) spatially formed by the connection vector S and the motion vector M, and a reference time point t0 satisfy a threshold condition stored in the memory system 150, a speech trigger is generated to enable recognition of the user's voice command.

After switching to a speech recognition mode by the speech trigger, it is determined whether the user defines a field for issuance of the voice command. As described above, the field of command is determined based on a spatial area indicated by the user's finger. The electronic devices located in the field of command defined by the user are to recognize the user's voice command and perform an operation according to the voice command, while the electronic devices not located in the field of command are to ignore the user's voice command. If the gesture of the user does not satisfy the condition for defining the field of command, the field of command is not considered and only the electronic device for which the user designates the command vector C using the finger is to execute the voice command.

Figure 15:
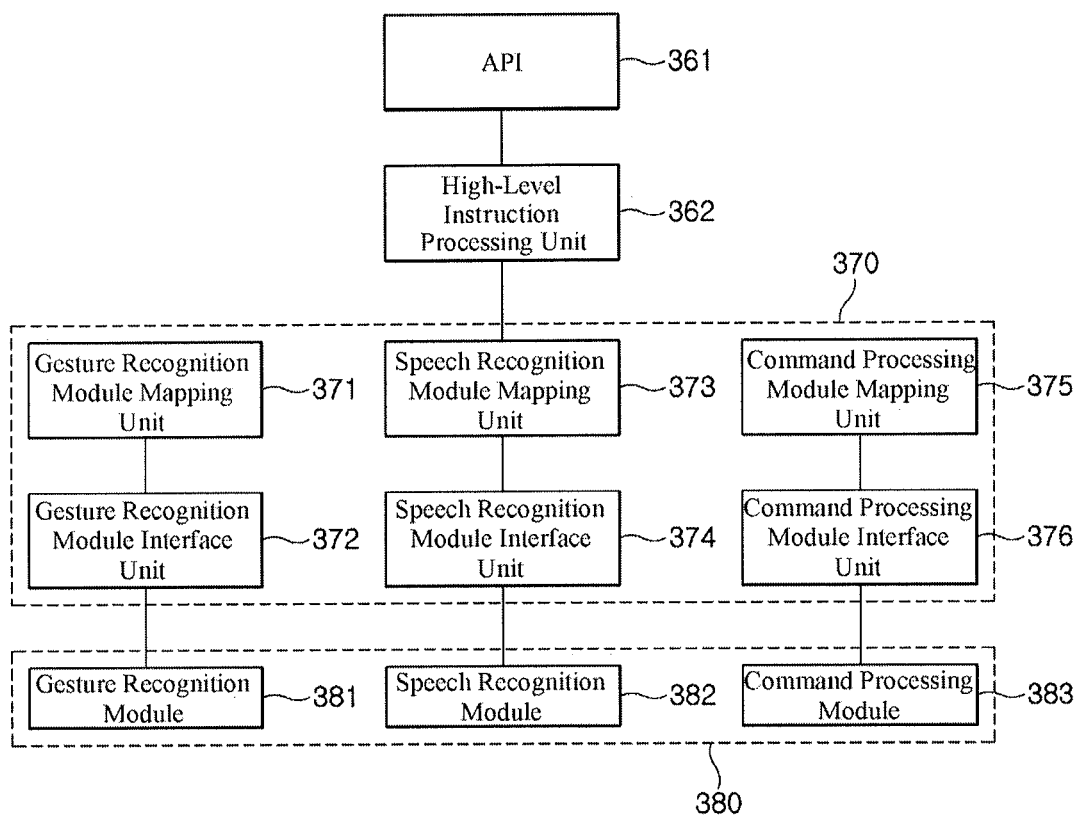
FIG. 15 is an illustrative diagram showing the software configuration of an electronic device utilizing an optimum control method based on a gesture-speech multi-mode command according to one embodiment of the invention.

FIG. 15 is an illustrative diagram showing the software configuration of an electronic device utilizing an optimum control method based on a gesture-speech multi-mode command according to one embodiment of the invention. An application module 380 of the electronic device utilizing the optimum control method based on a gesture-speech multi-mode command according to one embodiment of the invention may comprise a gesture recognition module 381 for recognizing a gesture of a user moving a finger with respect to a body coordinate point, a speech recognition module 382 for receiving and processing a voice command transmitted by the user through a microphone after switching to a speech recognition mode, and a command processing module 383 for controlling the operation of the electronic device according to the voice command inputted by the user.

The electronic device 100 including the application module 380 may use various operating systems as its operating system. The operating system provides high-level instructions to an application program interface (API) 361 to control the operation of each module of the application module 380. The electronic device 100 according to the invention comprises a high-level instruction processing unit 362 for identifying each corresponding module of the application module 380 according to a high-level instruction provided from the API 361, and for decoding and providing the high-level instruction to the corresponding module. An application module control unit 370 is configured to control the operation of the application module 380 according to the instruction provided from the high-level instruction processing unit 362. That is, the high-level instruction processing unit 362 is configured to identify whether a corresponding module of the application module 380 exists according to the high-level instruction provided through the API, and when the corresponding module exists, to decode the high-level instruction to an instruction recognizable to the corresponding module and provide it to a corresponding mapping unit or control message transmission. The application module control unit 370 comprises mapping units 371, 373, 375 and interface units 372, 374, 376 for the gesture recognition module 381, the speech recognition module 382, and the command processing module 383, respectively.

The gesture recognition module mapping unit 371 is configured to receive, from the high-level instruction processing unit 362, a high-level instruction for recognizing the user's gesture through a camera attached to the electronic device 100 and processing a result of the recognition, and to map the high-level instruction to a device-level instruction that may be processed by the gesture recognition module 381 and provide it to the gesture recognition module 381 through the gesture recognition module interface unit 372. The speech recognition module mapping unit 373 and the speech recognition module interface unit 374 are configured to recognize a voice command of the user through a microphone attached to the electronic device 100 and process the voice command. That is, the speech recognition module mapping unit 373 is configured to receive, from the high-level instruction processing unit 362, a high-level instruction for using the speech recognition module 382, and to map the high-level instruction to a device-level instruction and provide it to the speech recognition module 382 through the speech recognition module interface unit 374. The command processing module 383 is configured to analyze and process the user's voice command transmitted through the speech recognition module 382. The command processing module mapping unit 375 is configured to receive a high-level instruction for executing the user's voice command through the high-level instruction processing unit 362, and to map the high-level instruction to a device-level instruction recognizable to the command processing module 383. The device-level instruction is provided to the command processing module 383 through the command processing module interface unit 376. Accordingly, the command processing module 383 is executed to provide a result of comparison between a recognition value of the gesture caused by the user's motion and a trigger reference value stored in the memory system 150. When the gesture recognition value falls within the range of the trigger reference value, the speech recognition mode of the electronic device is activated and the user's voice command analyzed by the speech recognition module 382 is executed.

The detailed member functions for the API 361 configured to perform the above functions will be described in more detail below. An Open API is used to open, at the request of the electronic device 100, a session of the application module for switching on/off of the device, display of a lock screen, gesture recognition, speech recognition, and processing of the user's voice command. A Close API is used to terminate a session for the application module that has been used. A Retrieve API is used to retrieve the application module that may be called from the electronic device 100. A Status API is used to determine the operating status of each module of the application module. An Initialize API functions to initialize the application module so that it may be called. A List API is used to check a function or operation provided to the user through the electronic device 100, a list of commands that may be executed through gesture recognition or speech recognition, and the like. A Register API functions to register information such as gestures or voice commands inputted by the user through the electronic device 100. An Unregister API is used to unregister information such as gestures or voice commands inputted by the user. As a result, such individual APIs are executed according to the application module to be used or the type of message transmission, so that the application module may be used in recognizing the user's gestures or speeches and executing the commands.

Although the embodiments of the invention have been described above with reference to the accompanying drawings, those skilled in the art to which the invention pertains will understand that the invention may be practiced in other specific forms without changing the technical ideas or essential features of the invention. Therefore, it is to be understood that the above-described embodiments are not restrictive but illustrative in all aspects. The scope of the invention is defined by the appended claims rather than the above detailed description, and all changes or modifications derived from the spirit and scope of the claims and all equivalents thereof are to be construed as falling within the scope of the invention.

What is claimed is:

1. An optimum control method based on a gesture-speech multi-mode command, the method controlling an electronic device having a gesture recognition device and a speech recognition device, and comprising the steps of:
   receiving gesture information of a user through the gesture recognition device;
   detecting a first body coordinate point and a second body coordinate point of the user from the gesture information;
   detecting a connection vector extending from the first body coordinate point to the second body coordinate point, and a motion vector of the second body coordinate point; and
   generating a speech trigger to enable recognition of a speech of the user, when a characteristic value of the motion vector satisfies a predetermined threshold condition,
   wherein after the speech trigger is generated, an area in which a voice command of the user is to be executed is determined according to a field of command formed by the second body coordinate point of the user, and
   wherein the field of command includes a spatial area formed by extension lines between the first body coordinate point of the user and points that the second body coordinate point of the user forms in a vertical or horizontal direction, with respect to a direction faced by the first body coordinate point.

2. The method of claim 1, wherein the first body coordinate point of the user is a coordinate point of a location of an eye, a nose, or a mouth of the user.

3. The method of claim 1, wherein the second body coordinate point of the user is a coordinate point of a location of a fingertip of the user.

4. The method of claim 1, wherein the connection vector is information on a straight line extending from the first body coordinate point to the second body coordinate point.

5. The method of claim 1, wherein the motion vector is a vector connecting the second body coordinate point of the user from a first point of time to a second point of time.

6. The method of claim 1, wherein the characteristic value of the motion vector is information on a distance by which the second body coordinate point is moved from a first point of time to a second point of time, a hand pose of the user, or an angle spatially formed by the connection vector and the motion vector.

7. The method of claim 1, wherein the threshold condition has a different range for the characteristic value of the motion vector depending on the connection vector.

8. The method of claim 1, wherein after the speech trigger is generated, recognition of a voice command of the user is started before or after a specific point of time.

9. The method of claim 8, further comprising the step of:
   defining an extension line of the first body coordinate point and the second body coordinate point as a command vector, and executing the voice command of the user when a characteristic value of the command vector satisfies a predetermined execution condition.

10. The method of claim 9, wherein the characteristic value of the command vector is information on a distance by which the second body coordinate point of the user is moved along the motion vector, or a time for which the second body coordinate point of the user is moved along the motion vector.

11. The method of claim 1, further comprising the step of:
    controlling an operation of a peripheral electronic device according to a voice command of the user.

12. The method of claim 11, wherein the step of controlling the operation of the peripheral electronic device comprises the step of:
    generating a speech trigger for switching the peripheral electronic device to a speech recognition mode, when the characteristic value of the motion vector satisfies the predetermined threshold condition.

13. The method of claim 11, wherein the step of controlling the operation of the peripheral electronic device comprises the step of:
    generating a command for muting or reducing sound of the peripheral electronic device for a predetermined period of time from a starting point of speech recognition.

14. The method of claim 1, further comprising the step of:
determining one or more peripheral electronic devices within the spatial area; and
controlling an operation of the one or more peripheral electronic devices simultaneously based on a voice command of the user.

15. The method of claim 1, wherein the points are points on a boundary of an area defined based on movements of the second body coordinate point of the user.

16. An electronic device based on a gesture-speech multi-mode command, the electronic device having gesture recognition and speech recognition functions, and comprising:
a gesture recognition unit configured to recognize gesture information of a user;
a speech recognition unit configured to recognize a voice command of the user;
a coordinate point detection unit configured to detect a first body coordinate point and a second body coordinate point of the user from the gesture information recognized by the gesture recognition unit;
a vector detection unit configured to detect a connection vector extending from the first body coordinate point to the second body coordinate point, or a motion vector of the second body coordinate point; and
a control unit configured to generate a speech trigger for recognizing the voice command of the user, when a characteristic value of the motion vector satisfies a predetermined threshold condition,
wherein after the speech trigger is generated, an area in which a voice command of the user is to be executed is determined according to a field of command formed by the second body coordinate point of the user, and
wherein the field of command includes a spatial area formed by extension lines between the first body coordinate point of the user and points that the second body coordinate point of the user forms in a vertical or horizontal direction, with respect to a direction faced by the first body coordinate point.

17. The electronic device of claim 16, wherein the gesture recognition unit comprises a camera module and a motion sensor.

18. The electronic device of claim 16, wherein the speech recognition unit comprises a microphone and a voice sensor.

19. The electronic device of claim 16, wherein the control unit comprises a peripheral device control unit configured to control an operation of a peripheral electronic device according to the voice command of the user inputted through the speech recognition unit.

20. The electronic device of claim 19, wherein the peripheral electronic device control unit is configured to switch the peripheral electronic device to a speech recognition mode to enable recognition of the voice command of the user, when the characteristic value of the motion vector satisfies the predetermined threshold condition.

21. The electronic device of claim 16, wherein the speech trigger includes a command for muting or reducing sound of a peripheral electronic device for a predetermined period of time from a starting point of speech recognition.

\* \* \* \* \*